(12) United States Patent
Baden et al.

(10) Patent No.: US 9,782,999 B2
(45) Date of Patent: Oct. 10, 2017

(54) MISMATCH SIDE RIM AND LOCK RING INTERFACE ANGLES FOR LOCK RING WHEEL

(71) Applicant: Goodrich Corporation, Charlotte, NC (US)

(72) Inventors: Bradley J. Baden, Troy, OH (US); Katrina Lynn King, Columbus, OH (US)

(73) Assignee: Goodrich Corporation, Charlotte, NC (US)

( * ) Notice: Subject to any disclaimer, the term of this patent is extended or adjusted under 35 U.S.C. 154(b) by 1 day.

(21) Appl. No.: 14/918,252

(22) Filed: Oct. 20, 2015

(65) Prior Publication Data

US 2017/0106694 A1    Apr. 20, 2017

(51) Int. Cl.
*B60B 25/04* (2006.01)
*B60B 25/18* (2006.01)
*B60B 25/12* (2006.01)
*B60B 25/08* (2006.01)
*B60B 25/14* (2006.01)
*B60B 25/22* (2006.01)
*B60B 21/10* (2006.01)
*B60B 23/02* (2006.01)
*B64C 25/34* (2006.01)
*B64C 25/36* (2006.01)

(52) U.S. Cl.
CPC .............. *B60B 25/04* (2013.01); *B60B 25/08* (2013.01); *B60B 25/12* (2013.01); *B60B 25/14* (2013.01); *B60B 25/18* (2013.01); *B60B 21/10* (2013.01); *B60B 23/02* (2013.01); *B60B 25/22* (2013.01); *B60B 2900/523* (2013.01); *B64C 25/34* (2013.01); *B64C 25/36* (2013.01)

(58) Field of Classification Search
CPC ....... B60B 25/04; B60B 25/045; B60B 25/08; B60B 25/14; B60B 25/18; B60B 25/12; B60B 21/125; B64C 25/36
USPC .......................................... 152/410
See application file for complete search history.

(56) References Cited

U.S. PATENT DOCUMENTS

| | | | | |
|---|---|---|---|---|
| 3,026,923 A | * | 3/1962 | Prins ....................... | B60B 25/18 152/410 |
| 4,438,797 A | * | 3/1984 | Suckow .................. | B60B 25/22 152/410 |
| 4,453,583 A | * | 6/1984 | Smith ..................... | B60B 25/08 152/410 |
| 4,706,723 A | * | 11/1987 | Loeber ................... | B60B 25/04 152/396 |
| 4,911,216 A | * | 3/1990 | Yamoto .................. | B60B 25/04 152/409 |

(Continued)

*Primary Examiner* — Kip T Kotter
*Assistant Examiner* — Scott A Browne
(74) *Attorney, Agent, or Firm* — Snell & Wilmer L.L.P.

(57) ABSTRACT

Systems and methods disclosed herein may be useful for use in a wheel assembly. In this regard a wheel assembly may comprise a wheel base with a center axis, a side rim disposed about a circumference of the wheel base, wherein the side rim includes a frustoconical radially inward surface, and a lock ring comprising a single unitary member. The lock ring may secure the side rim onto the wheel base, the lock ring preventing the side rim from sliding axially with respect to the wheel base, wherein a frustoconical radially outward surface of the lock ring comprises a first angle with respect to the frustoconical radially inward surface of the side rim.

18 Claims, 4 Drawing Sheets

(56) References Cited

U.S. PATENT DOCUMENTS

| | | | | |
|---|---|---|---|---|
| 5,086,821 A * | 2/1992 | Russell | ............... | B60B 25/18 |
| | | | | 152/409 |
| 5,240,055 A * | 8/1993 | Smith | ............... | B60B 25/08 |
| | | | | 152/409 |
| 5,259,430 A * | 11/1993 | Smith | ............... | B60B 25/18 |
| | | | | 152/409 |
| 6,550,510 B2 * | 4/2003 | Champion | ............... | B60B 25/14 |
| | | | | 152/409 |
| 2009/0152935 A1 * | 6/2009 | Durif | ............... | B60B 25/14 |
| | | | | 301/10.1 |
| 2014/0292060 A1 * | 10/2014 | Phillis | ............... | B60B 15/00 |
| | | | | 301/41.1 |

\* cited by examiner

MISMATCH SIDE RIM AND LOCK RING INTERFACE ANGLES FOR LOCK RING WHEEL

FIELD

The present disclosure is related to a lock ring assembly for use in, for example, an aircraft wheel.

BACKGROUND

Aircraft wheels often comprise a wheel base, a side rim, and a lock ring. The wheel base is typically coupled to the aircraft brake for applying torque to cause the aircraft to decelerate. The side rim is typically coupled about a circumference of the wheel base and is often at least partially in contact with a tire. A lock ring is typically placed in between the wheel base and the side rim for retaining the side rim to the wheel base and for transferring torque from the wheel base to the side rim. However, in systems having large wheel bases (e.g., 19 inches (48.26 centimeters) in diameter or greater), high torque at application speed may lead to a wheel-skid. A wheel-skid is an event in which the tire and side rim continue to roll at ground speed, while the wheel base is locked to the brake and not rotating. A wheel-skid is in contrast to a tire-skid, where the tire is stationary, and sliding, relative to the runway.

SUMMARY

A lock ring wheel assembly is provided. A lock ring wheel assembly may comprise a wheel base having a center axis, a side rim disposed about a circumference of the wheel base, wherein the side rim includes a radially inward frustoconical surface configured to engage a lock ring; and the lock ring comprising a single unitary member. The lock ring may secure the side rim onto the wheel base, the lock ring preventing the side rim from sliding axially with respect to the wheel base, wherein a radially outward frustoconical surface of the lock ring forms a first angle with respect to the radially inward frustoconical surface of the side rim, the radially outward frustoconical surface configured to engage the radially inward frustoconical surface, wherein the first angle is between 0.5 degrees and 2 degrees.

In various embodiments, the first angle may comprise about 1°. The radially outward frustoconical surface of the lock ring may comprise a second angle with respect to the center axis, wherein the second angle comprises about 5°. The radially outward frustoconical surface of the lock ring may comprise a second angle with respect to the center axis, wherein the second angle comprises between about 0° and 10°. The radially inward frustoconical surface of the side rim may comprise a third angle with respect to the center axis, wherein the third angle comprises about 6°. The radially inward frustoconical surface of the side rim may comprise a third angle with respect to the center axis, wherein the third angle comprises between about 0° and 10°. The first angle may create a gap between the radially outward frustoconical surface of the lock ring and the radially inward frustoconical surface of the side rim, the gap originating at a line of contact and increasing in width along an axially outboard direction. The line of contact may be configured to prevent movement of the lock ring with respect to at least one of the wheel base or the side rim. The lock ring may comprise a cross-sectional profile that includes a rounded portion and a flange. The lock ring may comprise a fillet between the rounded portion and the flange. The lock ring may comprise at least one chamfer located on the flange. The lock ring may be comprised of a material comprising at least one of steel, a poly matrix composite and an aluminum alloy. The lock ring wheel assembly may further comprise a cavity including a bottom surface formed on the wheel base and a top surface formed on the radially inward frustoconical surface of the side rim, the lock ring located within the cavity. A retaining ring may be located adjacent to the lock ring to prevent the side rim from sliding axially inboard.

A method for assembling a wheel assembly is provided. The method may comprise placing a wheel base inside a tire, the wheel base having an air seal seat; placing a side rim around the wheel base so that the air seal seat is exposed; placing an air seal around the wheel base and inside the air seal seat; inserting a lock ring comprising a single unitary member inside a cavity defined between the wheel base and the side rim, such that a radially outward surface of the lock ring forms an angle of between 0.5° and 2° with respect to a radially inward surface of the side rim; and inflating the tire.

In various embodiments, the method may further comprise creating a torque transfer path through the lock ring. The lock ring may comprise a rounded portion and a flange. The method may further comprise creating a gap beginning at a line of contact between the radially outward surface of the lock ring and the radially inward surface of the side rim that increases in radial dimension along an axially outboard direction.

A wheel assembly is provided. The wheel assembly may comprise a wheel base, a side rim disposed about a circumference of the wheel base, a cavity disposed between the wheel base and the side rim, the cavity comprising a top surface, and a lock ring, disposed within the cavity, wherein the top surface and a radially outward surface of the lock ring comprise and angle of between 0.5 degrees and 2 degrees, wherein the lock ring is configured to contact the side rim via a concentrated line of contact, wherein the lock ring comprises a single unitary member.

In various embodiments, the lock ring may be configured to contact the side rim at an axially inboard location of the lock ring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

Wheel skids may occur where high torque change rates, high torque magnitudes, and/or high rates of speed are used. Stated another way, when the rate of torque application changes rapidly and/or when high torque magnitudes are applied, a wheel skid tends to be more likely. Torque capacity may be defined as the ability of a lock ring assembly to withstand high torque change rates and/or high torque magnitudes without entering a wheel skid. Thus, improving the torque capacity of a lock ring assembly may thus allow the lock ring assembly to more reliably transfer torque under a high torque change rate, at high torque magnitudes and/or at a high rate of speed.

Systems and methods disclosed herein may be useful for lock ring assemblies. Although the embodiments herein are described with reference to lock ring assemblies used in connection with aircraft wheels, such embodiments are provided for example only as it is contemplated that the disclosures herein have applicability to other vehicles, such as for example, automobiles.

As described above, a lock ring assembly may transfer torque from a wheel base to a side rim. A wheel base and side rim together (whether with a lock ring assembly or without) may be referred to as a wheel assembly. In various embodiments, a lock ring assembly may comprise any number of lock rings, although in various embodiments a lock ring assembly comprises a single lock ring. A single lock ring as used herein may comprise a single unitary member. Thus, according to various embodiments, the lock ring does not comprise multiple pieces, such as a plurality of pieces coupled together or interfacing to form a locking mechanism.

Figure 1:
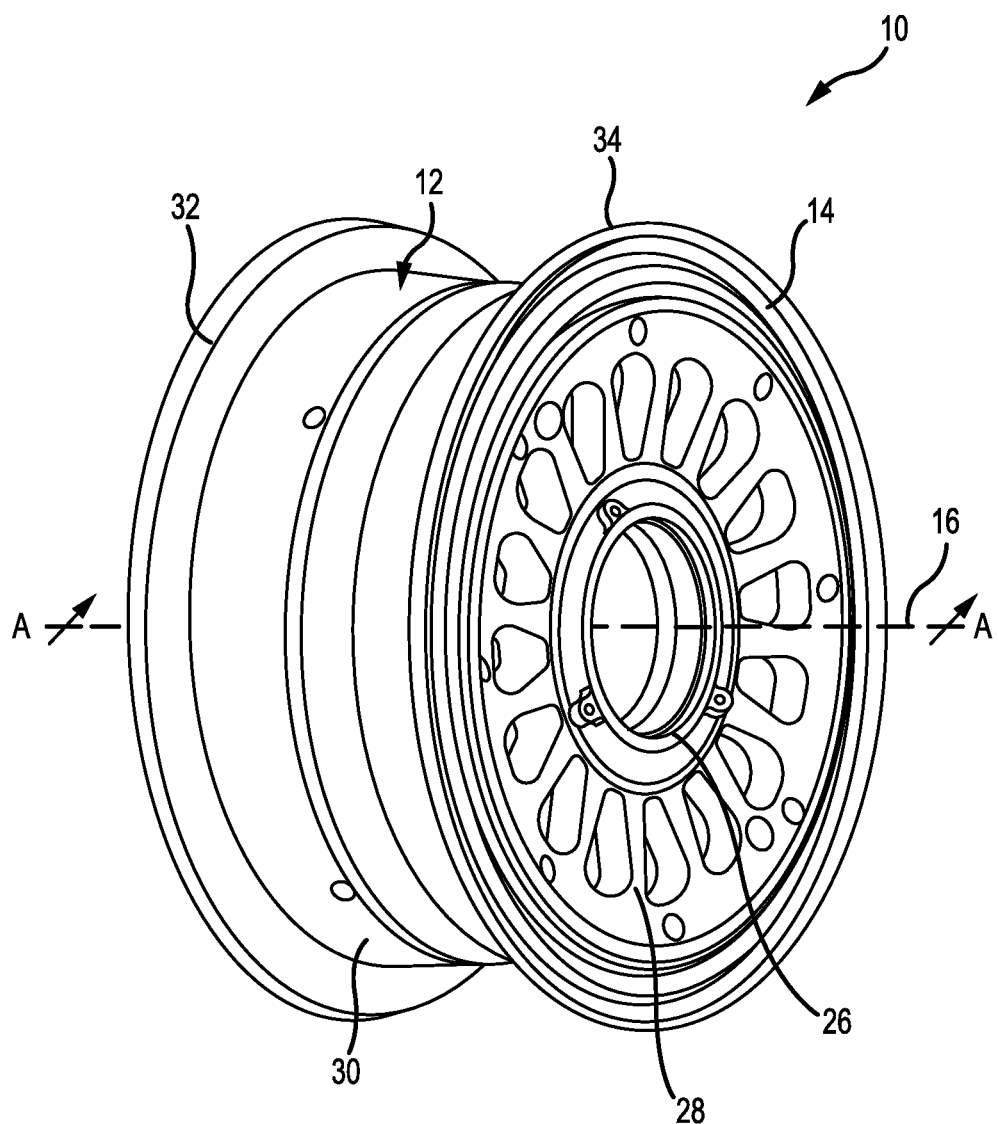
FIG. 1 illustrates, in accordance with various embodiments, a perspective view of a wheel assembly.
Figure 2:
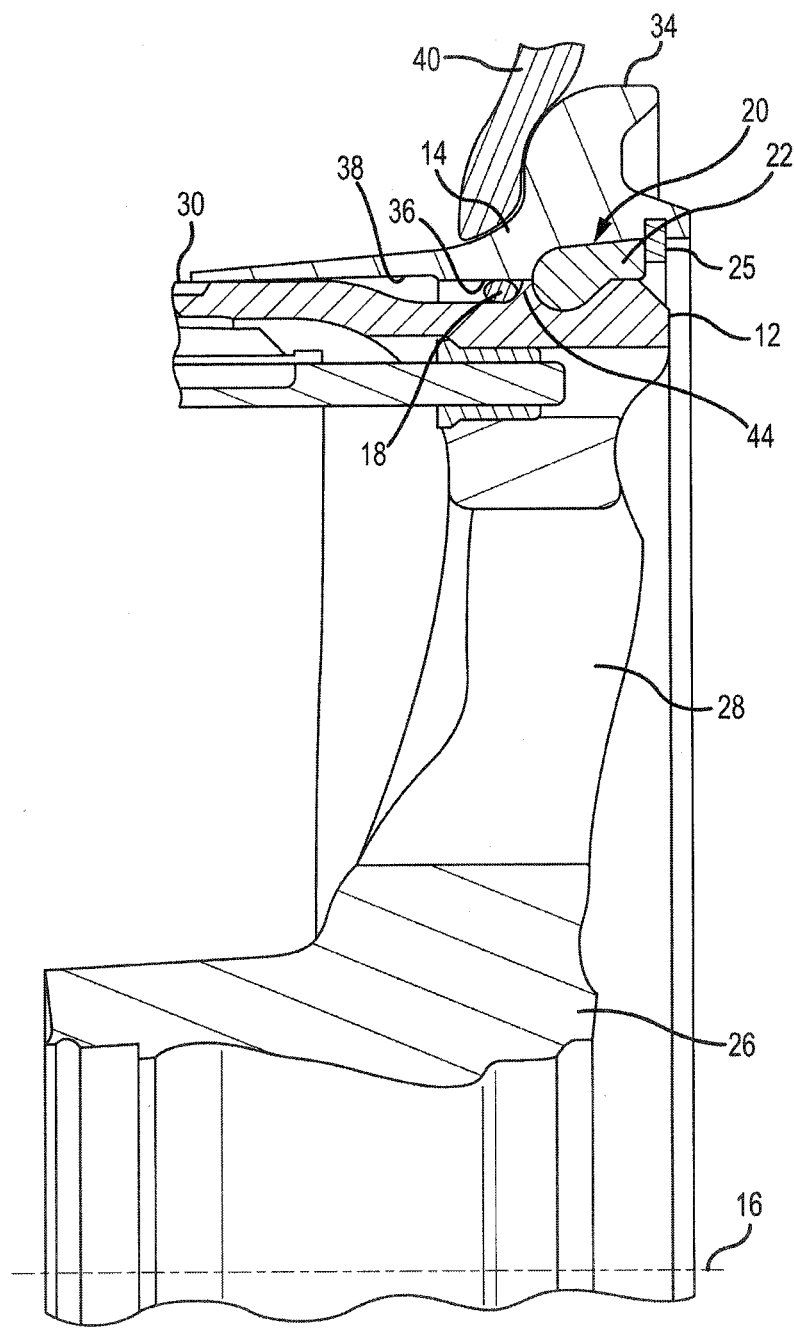
FIG. 2 illustrates, in accordance with various embodiments, a cross-section view of a portion of a wheel assembly.

FIG. 1 is a perspective view of a wheel assembly 10 according to the present invention, and FIG. 2 is a cross-sectional view of the wheel assembly 10 of FIG. 1 taken along line A-A. Line A-A may define axis 16. Axis 16 may be a center axis of a wheel. Wheel assembly 10 may include wheel base 12, side rim 14, axis 16, air seal 18, cavity 20, lock ring 22, and retaining ring 25. In various embodiments, as shown in FIGS. 1 and 2, wheel base 12 includes hub 26, spokes 28, tubewell 30, and inboard flange 32. Side rim 14 includes outboard flange 34, inside surface 36, and recess 38. Wheel assembly 10 may also include tire 40.

Hub 26 may be disposed radially inward (with respect to axis 16) from tubewell 30 and may be the point of contact between an axle of an aircraft or vehicle and wheel assembly 10. Spokes 28 extend radially outward from hub 26 and connect tubewell 30 to hub 26. When wheel assembly 10 is mounted onto an aircraft or any other vehicle, inboard is defined as the direction facing the center of the aircraft or vehicle structure and outboard is defined as the direction facing outward or away from the center of the aircraft or vehicle structure. In various embodiments, inboard and outboard refer to the directions illustrated in the drawing, but in further embodiments, they may be reversed. Inboard flange 32 may be disposed on tubewell 30 and extend radially outward from tubewell 30 and extend axially inboard. Side rim 14 may be disposed around the circumference of tubewell 30 opposite inboard flange 32. Side rim 14 may be coaxial with wheel base 12, both being centered about axis 16. Outboard flange 34 extends radially outward from side rim 14 and extends axially outboard. Tire 40 may be disposed around tubewell 30 between inboard flange 32 and outboard flange 34. Inside surface 36 of side rim 14 faces tubewell 30 of wheel base 12. Recess 38 may be formed on inside surface 36. Cavity 20 may be disposed between side rim 14 and tubewell 30 of wheel base 12 and may house lock ring 22 when wheel assembly 10 is assembled. Retaining ring 25 may axially retain lock ring 22 inside cavity 20. Retaining ring may be located adjacent to (in the positive x-direction) lock ring 22. Retaining ring 25 may prevent side rim 14 from axially sliding inboard. Air seal 18 may be disposed circumferentially around tubewell 30 of wheel base 12 and may be disposed between tubewell 30 of wheel base 12 and inside surface 36 of side rim 14. Air seal 18 may interface with air seal seat 44 on an outside surface of wheel base 12. In various embodiments, as shown in FIGS. 1 and 2, air seal 18 is an O-ring.

In response to lock ring 22 being correctly assembled and/or oriented inside cavity 20, lock ring 22 may act as a locking mechanism to prevent side rim 14 from sliding axially outboard off wheel base 12. In response to lock ring 22 being correctly assembled and/or oriented inside cavity 20, lock ring 22 may transmit torque from wheel base 12 to side rim 14, such that side rim 14 rotates in unison with wheel base 12. Stated another way, in response to lock ring 22 being correctly assembled and/or oriented inside cavity 20, lock ring 22 may transmit torque from wheel base 12 to side rim 14, such that side rim 14 does not rotate relative to wheel base 12. As disclosed below in the description of FIG. 3, lock ring 22 may form a contact point and torque pathway between wheel base 12 and side rim 14 at an axially inboard location of lock ring 22. A radially outward surface of lock ring 22 may be angled with respect to a radially inward surface of side rim 14 which may allow for a concentrated line of contact between lock ring 22 and side rim 14, thereby reducing the probability of wheel-skid occurring between wheel base 12 and side rim 14. Creating an angle between the radially outward surface of lock ring 22 and the radially inward surface of side rim 14, and thus concentrating the line of contact between lock ring 22 and side rim 14, may increase ease of assembly. Additionally, due to machining tolerances, concentrating the line of contact between lock ring 22 and side rim 14 at torque transfer path 380 (see FIG. 3) may resist and/or prevent play, or movement, of lock ring 22 within cavity 20, thus preventing galling of lock ring 22, side rim 14, and/or wheel base 12. This, line of contact between lock ring 22 and side rim 14 may remain in contact regardless of the load position on wheel assembly 10. Furthermore, in response to lock ring 22 being correctly assembled inside cavity 20, air seal 18 engages inside surface 36 of side rim 14 and tubewell 30 of wheel base 12, preventing air from leaking out of wheel assembly 10 between side rim 14 and wheel base 12 as tire 40 is inflated. Galling of lock ring 22 may occur by bottom surface 340 (see FIG. 3). Galling of side rim 14 may occur on surface 36 at the inboard end of side rim 14. Galling of wheel base 12 may occur at tubewell 30 and bottom surface 340.

Figure 3:
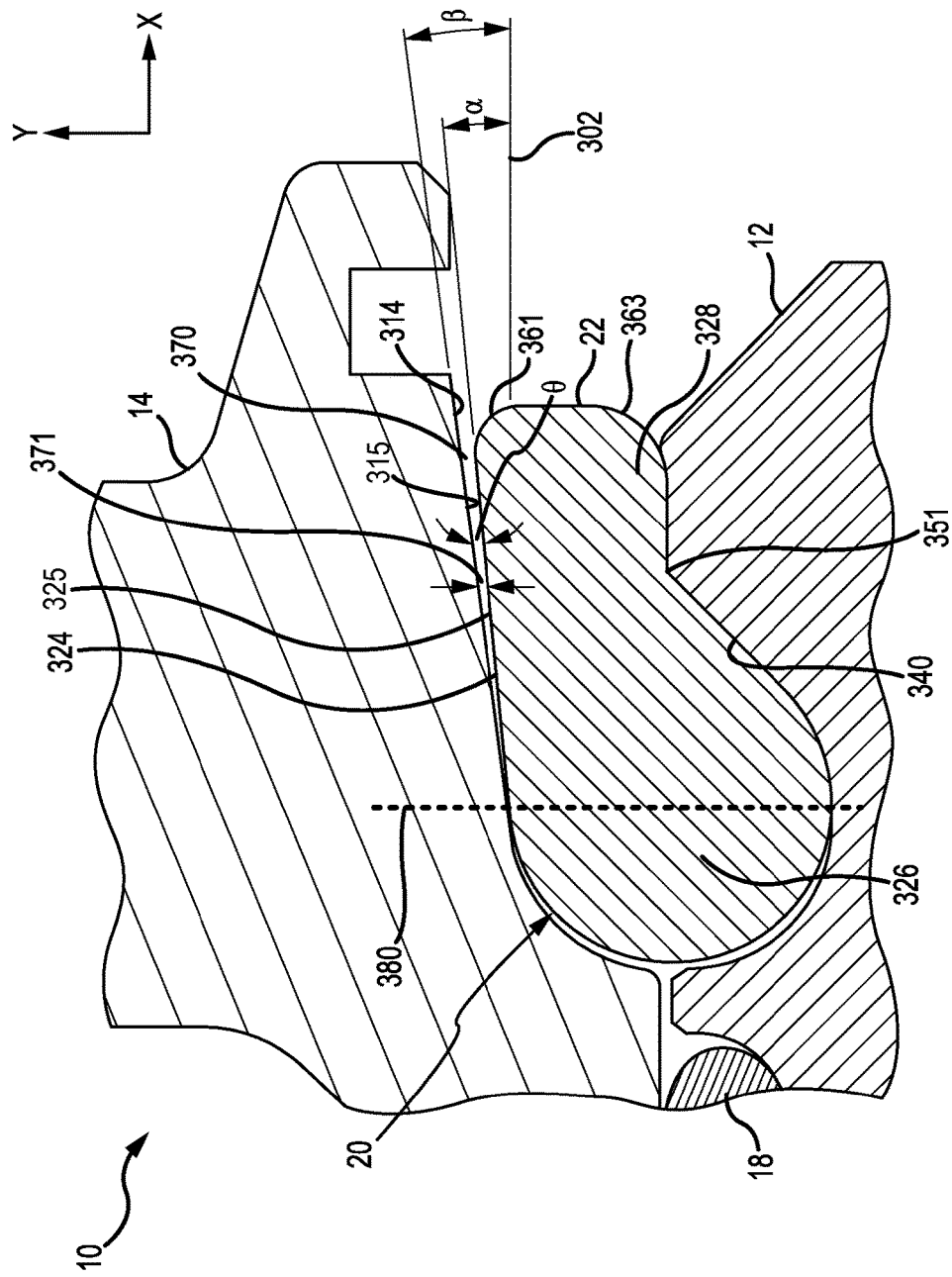
FIG. 3 illustrates, in accordance with various embodiments, a lock ring assembly in an installed position.

With reference to FIG. 3, lock ring 22 is illustrated in an installed position. In various embodiments, lock ring 22 may comprise a radially outward surface 324 which may comprise an angle α with respect to imaginary line 302. Imaginary line 302 represents a line which is parallel to axis 16 (see FIG. 1). Thus, lock ring 22 may comprise a radially outward surface 324 which may comprise an angle α with respect to axis 16 (see FIG. 1). In various embodiments, the radially outward surface 324 includes at least a frustoconical portion 325. Angle α may be measured from frustoconical portion 325. In various embodiments, angle α may comprise about five degrees (5°), wherein the term "about" in this context only refers to ±1°. In various embodiments, angle α may comprise between about zero degrees and about ten degrees (0°-10°), wherein the term "about" can only mean±1°. In various embodiments, angle α may be referred to herein as a second angle.

In various embodiments, side rim 14 may comprise a radially inward surface 314 which may comprise an angle β with respect to imaginary line 302. Thus, side rim 14 may comprise a radially inward surface 314 which may comprise an angle β with respect to axis 16 (see FIG. 1). In various embodiments, angle β may comprise about six degrees (6°), wherein the term "about" can only mean±1°. In various embodiments, angle β may comprise between about zero degrees and about ten degrees (0°-10°), wherein the term "about" in this context only refers to ±1°. In various embodiments, angle β may be referred to herein as a third angle. In various embodiments, the radially inward surface 314 includes at least a frustoconical portion 315. Angle β may be measured from frustoconical portion 315.

Accordingly, radially outward surface 324 may comprise an angle Θ with respect to radially inward surface 314. In various embodiments, angle Θ may comprise about one degrees (1°), wherein the term "about" in this context only refers to ±0.9°. In various embodiments, angle Θ may be between 0.5° and 2°. In various embodiments, angle Θ may be configured to be minimal. Accordingly, gap 370 may exist between radially inward surface 314 of side rim 14 and radially outward surface 324 of lock ring 22. In various embodiments, the width 371, as measured in the radial direction, of gap 370 may increase from axially inboard to the axially outboard direction, or along the axial direction (positive x-direction). Gap 370 may originate or begin at the line of contact at torque transfer path 380 and increases in width along the axial direction as previously mentioned. In various embodiments, angle Θ may be referred to herein as a first angle. Angle Θ may be measured from frustoconical portion 325 of radially outward surface 324 and frustoconical portion 315 of radially inward surface 314.

The locking mechanism described herein may be a lock ring, such as lock ring 22. Though it may have any desired shape, according to various embodiments depicted herein lock ring 22 may comprise a cross-sectional profile that comprises a rounded portion 326 and a flange 328. The lock ring 22 may be a generally circular lock ring or a split lock ring. This circular lock ring may have an axis at its center. In various embodiments, flange 328 may extend in the axially outboard direction (positive x-direction), away from rounded portion 326, when lock ring 22 is in an installed position.

In various embodiments, lock ring 22 may be configured to be compressed between side rim 14 and wheel base 12. In various embodiments, rounded portion 326 of lock ring 22 may contact side rim 14. Thus, a torque transfer path 380 may be created between rounded portion 326 and side rim 14 during operation of a vehicle, such as an aircraft, for example. In various embodiments, a torque transfer path may be created between rounded portion 326 and wheel base 12. In various embodiments, a torque transfer path may be created between flange 328 and wheel base 12.

In response to lock ring 22 being correctly installed inside cavity 20, lock ring 22 contacts or engages bottom surface 340 of cavity 20. Lock ring 22 also contacts or engages radially inward surface 314 of cavity 20. Because lock ring 22 is contacting both side rim 14 (at radially inward surface 314) and wheel base 12 (at bottom surface 340), lock ring 22 comprises a torque pathway between wheel base 12 and side rim 14. Thus, radially inward surface 314 may be configured to engage lock ring 22.

Lock ring 22 may comprise fillets and/or chamfers, such as fillet 351 and chamfers 361, 363. These fillets may reduce the stress concentration of portions of the wheel assembly and/or the torque pathways. Fillet 351 may be located between rounded portion 326 and flange 328. Fillet 351 and/or bottom surface 340 may distribute the stress experienced by lock ring 22 over a broader area and provide lock ring 22 with more durability and the capability of bearing larger loads. The design size and shape of fillet 351 may vary according to performance desires. In various embodiments, chamfers 361, 363 may reduce the weight of lock ring 22 and thus the overall weight of wheel assembly 10. Chamfers 361, 363 may be located on flange 328.

Lock ring 22 may comprise any suitable material. For example, lock ring 22 may be comprised of aluminum, steel, and/or a poly matrix composite (PMC).

Figure 4:
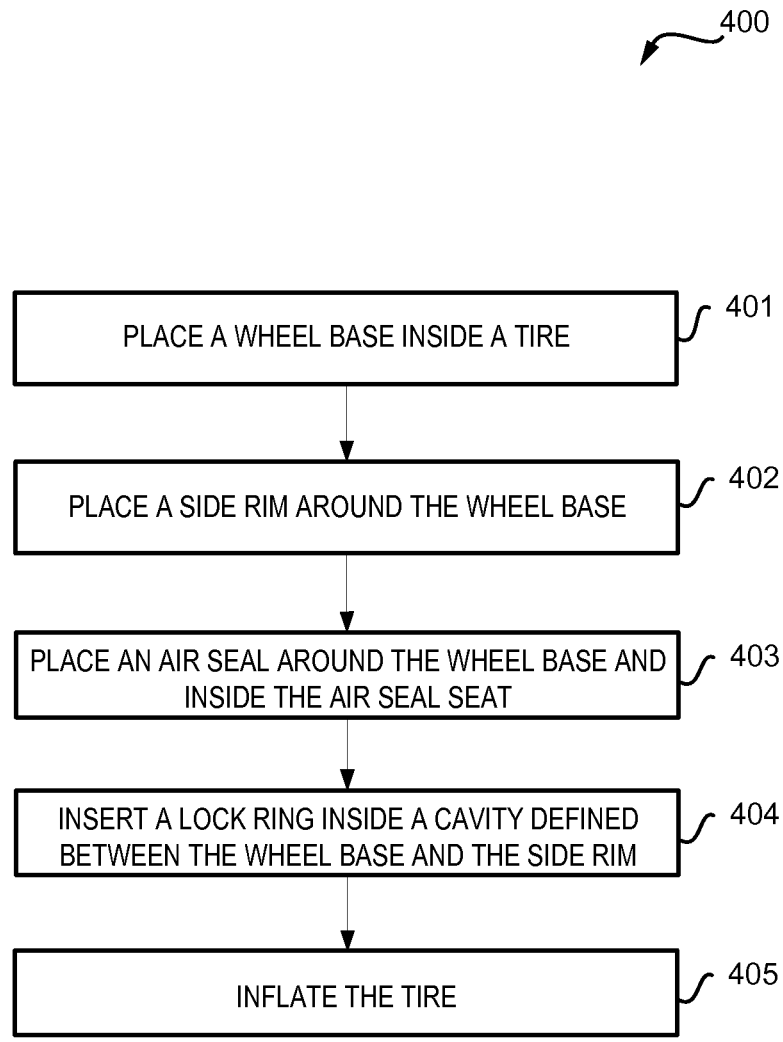
FIG. 4 illustrates, in accordance with various embodiments, a method for assembling a wheel assembly.

FIG. 4 discloses a diagram of method 400, which begins with placing a wheel base inside a tire (step 401). A side rim is placed around the wheel base (step 402). An air seal is placed around the wheel base and inside the air seal seat (step 403). A lock ring assembly, such as lock ring, is inserted inside a cavity defined between the wheel base and the side rim (step 405). The tire is inflated (406).

With further reference to FIG. 2, step 401 may include placing wheel base 12 inside tire 40, in accordance with various embodiments. The wheel base 12 may include air seal seat 44. In various embodiments, step 402 may include placing side rim 14 inside tire 40 and surrounding the wheel base 12 such that air seal seat 44 is exposed. In various embodiments, the side rim 14 may include recess 38 formed on inside surface 36 of the side rim 14. Step 403 may include placing air seal 18 around wheel base 12 and inside air seal seat 44. Step 404 may include inserting lock ring 22 inside cavity 20 defined between wheel base 12 and side rim 14. Step 405 may include inflating tire 40.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lock ring wheel assembly comprising:
   a wheel base, having a center axis;
   a side rim disposed about a circumference of the wheel base, wherein the side rim includes a radially inward frustoconical surface configured to engage a lock ring; and
   the lock ring comprising a single unitary member that secures the side rim onto the wheel base, the lock ring preventing the side rim from moving axially with respect to the wheel base, wherein a radially outward frustoconical surface of the lock ring forms a first angle with respect to the radially inward frustoconical surface of the side rim, the radially outward frustoconical surface configured to engage the radially inward frustoconical surface, wherein the first angle is between 0.5° and 2°,
   wherein the radially outward frustoconical surface is substantially linear; wherein the first angle creates a gap between the radially outward frustoconical surface of the lock ring and the radially inward frustoconical surface of the side rim, the gap originating at a line of contact and increasing in width along an axially outboard direction.

2. The lock ring wheel assembly of claim 1, wherein the first angle comprises 1°.

3. The lock ring wheel assembly of claim 1, wherein the radially outward frustoconical surface of the lock ring comprises a second angle with respect to the center axis, wherein the second angle comprises about 5°.

4. The lock ring wheel assembly of claim 1, wherein the radially outward frustoconical surface of the lock ring comprises a second angle with respect to the center axis, wherein the second angle comprises between about 0° and about 10°.

5. The lock ring wheel assembly of claim 1, wherein the radially inward frustoconical surface of the side rim comprises a third angle with respect to the center axis, wherein the third angle comprises about 6°.

6. The lock ring wheel assembly of claim 1, wherein the radially inward frustoconical surface of the side rim comprises a third angle with respect to the center axis, wherein the third angle comprises between about 0° and about 10°.

7. The lock ring wheel assembly of claim 1, wherein the line of contact is configured to resist movement of the lock ring with respect to at least one of the wheel base or the side rim.

8. The lock ring wheel assembly of claim 1, wherein the lock ring comprises a cross-sectional profile that includes a rounded portion and a flange.

9. The lock ring wheel assembly of claim 8, wherein the lock ring comprises a fillet between the rounded portion and the flange.

10. The lock ring wheel assembly of claim 8, wherein the lock ring comprises at least one chamfer located on the flange.

11. The lock ring wheel assembly of claim 1, wherein the lock ring is comprised of a material comprising at least one of steel, a poly matrix composite and an aluminum alloy.

12. The lock ring wheel assembly of claim 1, wherein the lock ring wheel assembly further comprises a cavity including a bottom surface formed on the wheel base and a top surface formed on the radially inward frustoconical surface of the side rim, the lock ring located within the cavity.

13. The lock ring wheel assembly of claim 1, wherein a retaining ring is located adjacent to the lock ring to prevent the side rim from sliding axially inboard.

14. A method for assembling a wheel assembly, the method comprising:
    placing a wheel base inside a tire, the wheel base having an air seal seat;
    placing a side rim around the wheel base so that the air seal seat is exposed;
    placing an air seal around the wheel base and inside the air seal seat;
    inserting a lock ring comprising a single unitary member inside a cavity defined between the wheel base and the side rim, such that a radially outward frustoconical surface of the lock ring forms an angle of between 0.5° and 2° with respect to a radially inward frustoconical surface of the side rim, the radially outward surface being substantially linear; creating a gap beginning at a line of contact between the radially outward frustoconical surface of the lock ring and the radially inward frustoconical surface of the side rim that increases in radial dimension along an axially outboard direction; and inflating the tire; and
    inflating the tire.

15. The method of claim 14, further comprising creating a torque transfer path through the lock ring.

16. The method of claim 14, wherein the lock ring comprises a rounded portion and a flange.

17. A wheel assembly comprising:
a wheel base;
a side rim disposed about a circumference of the wheel base;
a cavity disposed between the wheel base and the side rim, the cavity comprising a top surface; and
a lock ring, disposed within the cavity, wherein the top surface and a radially outward frustoconical surface of the lock ring comprise and angle of about between 0.5° and 2°, the radially outward frustoconical surface being substantially linear, a gap beginning at a line of contact between the radially outward frustoconical surface of the lock ring and a radially inward frustoconical surface of the side rim wherein said gap increases in radial dimension along an axially outboard direction, wherein the lock ring is configured to contact the side rim via the concentrated line of contact, wherein the lock ring comprises a single unitary member, wherein the lock ring is configured to contact the side rim via a concentrated line of contact, wherein the lock ring comprises a single unitary member.

18. The wheel assembly of claim 17, wherein the lock ring is configured to contact the side rim at an axially inboard location of the lock ring.

* * * * *